Sept. 14, 1926.
H. O. BALLARD
1,600,030
PROCESS OF AND APPARATUS FOR DEHYDRATING CRUDE PETROLEUM OIL.
Filed April 10, 1919   5 Sheets-Sheet 4
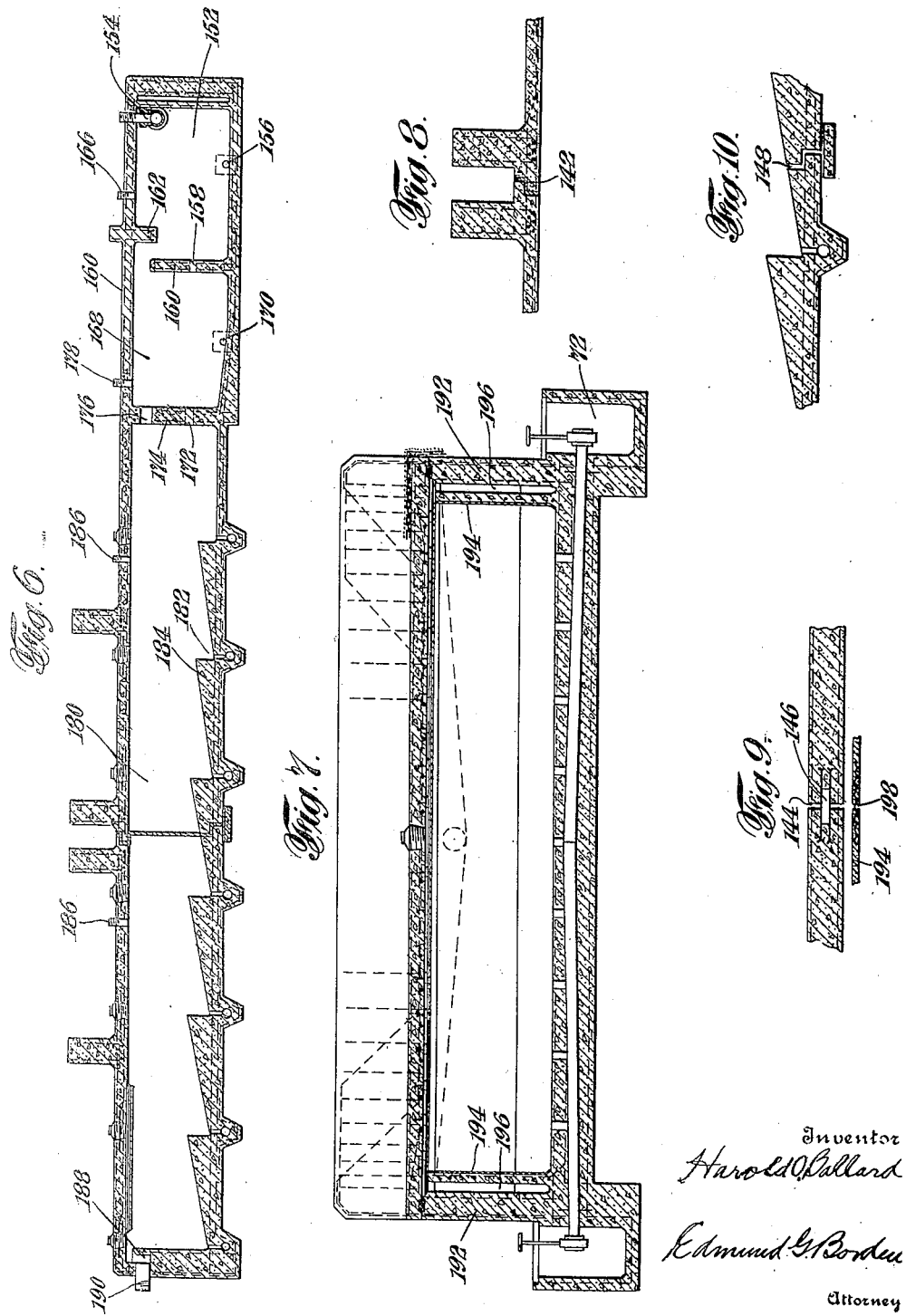
Inventor
Harold O. Ballard
Edmund G. Borden
Attorney

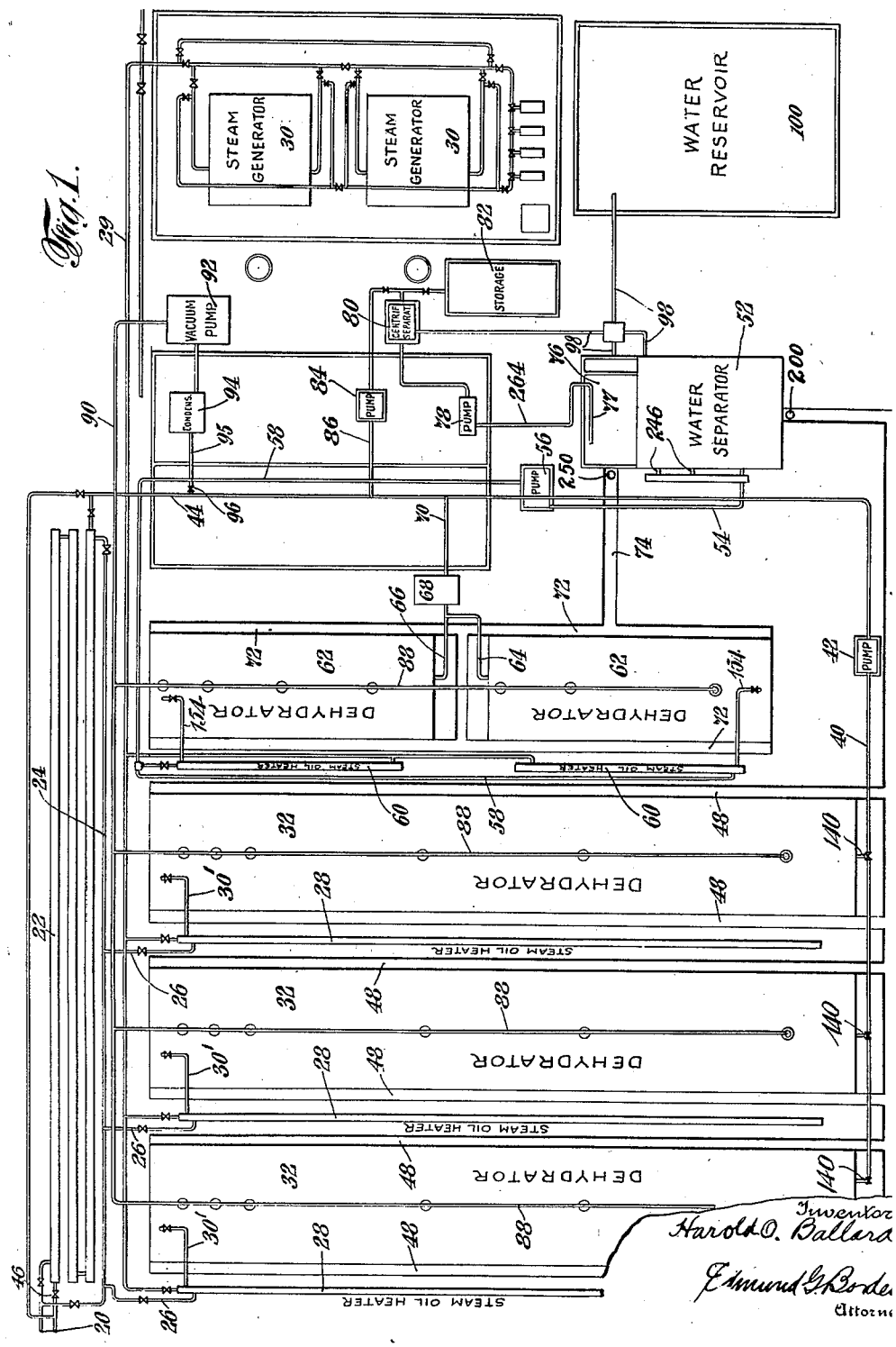

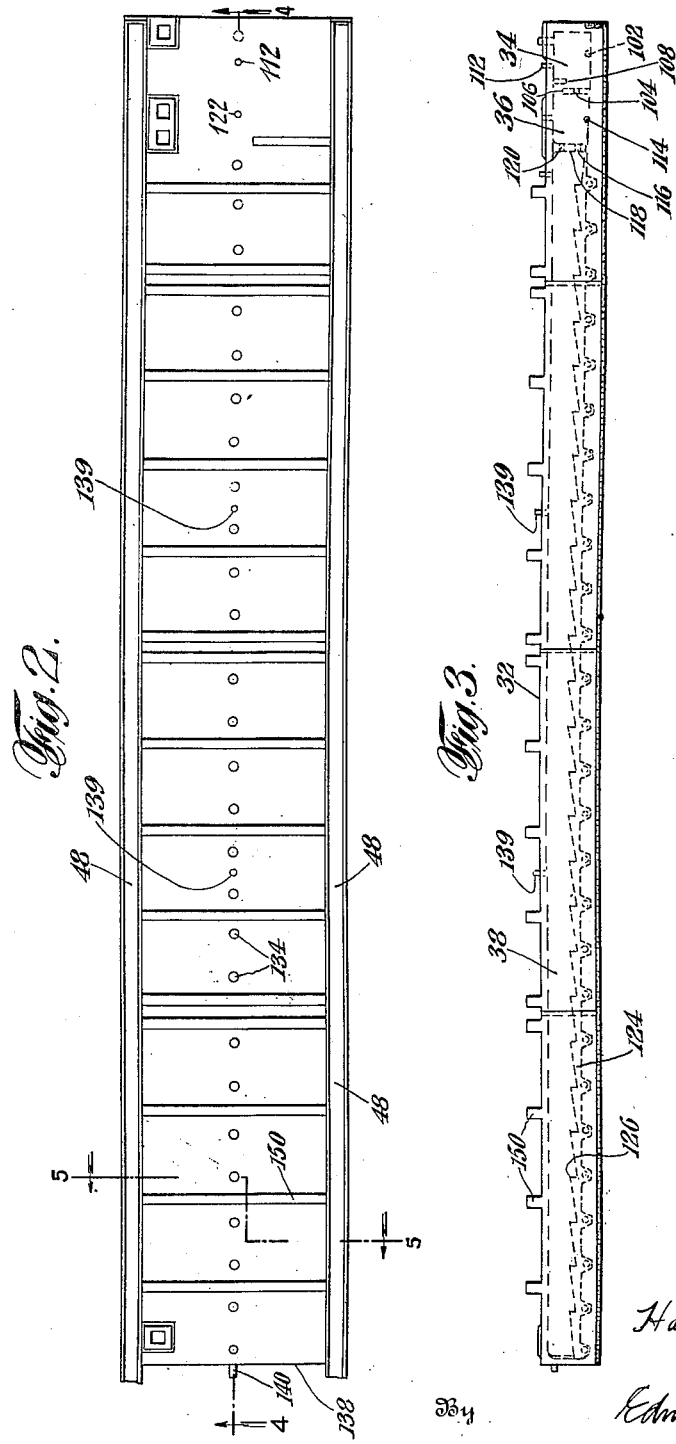

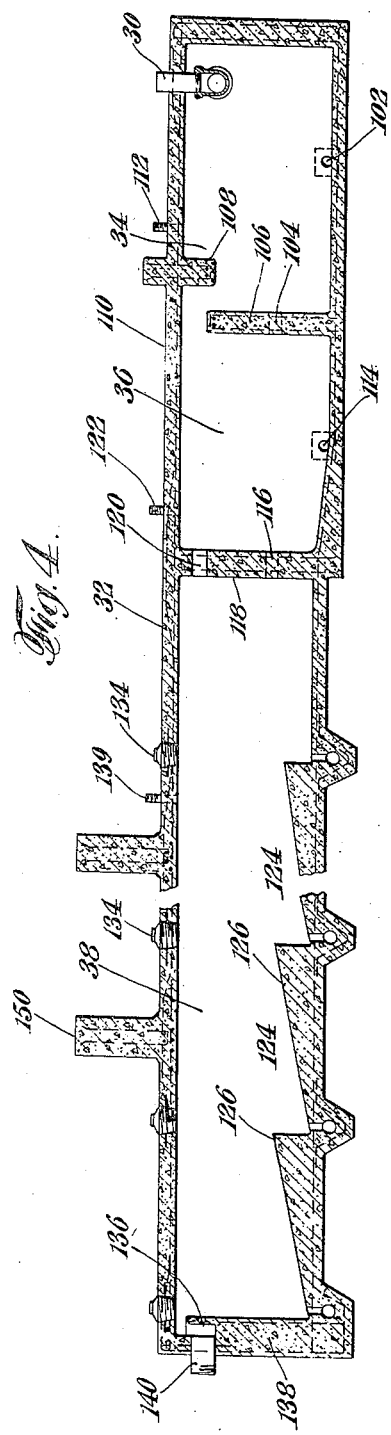

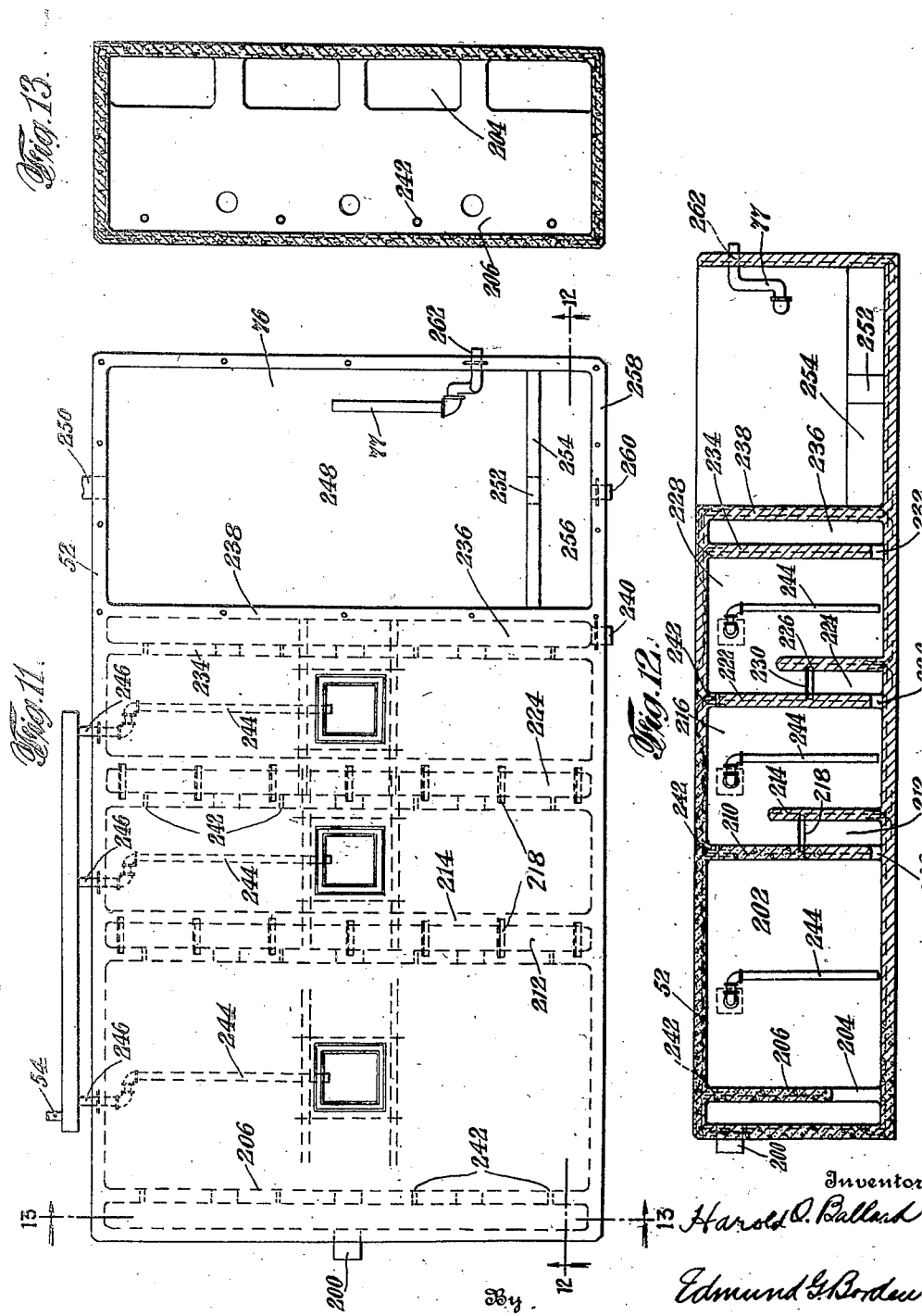

Patented Sept. 14, 1926.

1,600,03

UNITED STATES PATENT OFFICE.

HAROLD ORIN BALLARD, OF BARTLESVILLE, OKLAHOMA, ASSIGNOR, BY MESNE A
SIGNMENTS, TO DOHERTY RESEARCH COMPANY, OF NEW YORK, N. Y., A CORPOR.
TION OF DELAWARE.

PROCESS OF AND APPARATUS FOR DEHYDRATING CRUDE PETROLEUM OIL.

Application filed April 10, 1919. Serial No. 288,941.

This invention relates to the dehydration of oils and more particularly to a process of and apparatus for dehydrating crude petroleum oil.

Water, containing salts such as the chlorides and sulfates of calcium and magnesium is often found in the earth associated with petroleum oil and this salt water or brine is brought to the surface with the oil when the oil is removed from a well. If the salt water is merely mixed with the oil, it may be readily separated from the oil by conducting the mixture into a tank and allowing the water to settle. However, due to reasons not fully understood but apparently due to defective pumping apparatus and to the agitation of oil and water by gas, an emulsion is often formed in the oil which consists of an oil-water colloid and semi-colloid and minute globules of water suspended in the oil. This emulsion is very detrimental to the oil and it is very difficult to separate the emulsion from the oil.

The primary object of the present invention is to provide a method of treating oil to remove water and emulsion which is efficient and inexpensive in operation.

Another object of the invention is to provide an apparatus for dehydrating oil by which water and emulsion may be effectively separated from the oil without injury thereto.

Another object of the invention is to provide an improved emulsion separator for an oil dehydrating apparatus by which an emulsion may be effectively separated from oil without loss of the volatile constituents of the oil.

A further object of the invention is to provide a water separator for an oil dehydrating apparatus by which water may be effectively coagulated and separated from oil and emulsions.

With these and other objects in view, the invention consists in the improved process of and apparatus for dehydrating oil hereinafter described and defined in the claims.

The various features of the invention are illustrated in the accompanying drawings, in which—

Figure 1 is a diagrammatic view illustrating an apparatus in which oil may be dehydrated in accordance with the preferred form of the invention;

Fig. 2 is a plan view of the improv emulsion separator;

Fig. 3 is a view in side elevation par in section of the emulsion separator sho in Fig. 2;

Fig. 4 is a view of the emulsion separa shown in vertical section taken on the 1 4—4 of Fig. 2;

Fig. 5 is a view of the emulsion separa shown in vertical section taken on the 1 5—5 of Fig. 2;

Fig. 6 is a view of the high temperat emulsion separator shown in a vertical tion taken through the longitudinal cer of the separator;

Fig. 7 is a view of the high temperat emulsion separator shown in vertical tion taken transversely of the separator Fig. 8 is a detail vertical sectional v of the expansion joint used in the cove the emulsion separators;

Fig. 9 is a detail view in horizontal tion showing the expansion joints usec the side walls of the emulsion separat Fig. 10 is a detail view in vertical tion showing the expansion joint usec the floors of the emulsion separators;

Fig. 11 is a plan view of the impr water separator;

Fig. 12 is a view of the water separ shown in vertical section taken on the 12—12 of Fig. 11; and Fig. 13 is a view of the water separ shown in vertical section taken on the 13—13 of Fig. 11.

The preferred method of the presen vention for dehydrating petroleum oils sists in heating the oils to effect a r settlement of emulsion and water in th and the manipulation of the heated c a flowing body in such a manner tha water and emulsion are continuously rated from the flowing body as they therein. By heating the oil to the p temperature, a portion of the emulsior be decomposed, entrained water and sion in the oil will coagulate, and the cosity of the oil will be sufficiently decr to permit the water and emulsion to ra settle by gravity. However, if the a pheric temperatures are sufficiently hig the viscosity of the oil is low, the and emulsoin will often settle re enough so that it is not necessary to gi heat treatment. When the hydrated
 is in proper condition for rapid settling,
 her previously heated or not in accord-
 with the atmospheric conditions and
specific character of the oil, it is passed
 continuous stream through an emul-
separating chamber at such a rate that
 will be practically no agitation or dis-
ance of the liquid materials. In pass-
through the separating chamber, the oil
im flows over a series of pockets formed
he floor of the chamber and liquid is
inuously drawn off from the bottom of
pockets to increase the velocity of settle-
t of emulsion and water in the oil and
arry the emulsion and water out of the
aber. The liquid material drawn out
ugh the bottom of the pockets, which
ists of oil, emulsion and water, is con-
ed through a water separator where the
r is removed and the oil and emulsion
subjected to a heat treatment and then
ed through a second emulsion separat-
chamber to recover the oil therein. Any
lsion which is separated from the oil in
second separating chamber is conducted
 second water separator where the water
moved and the emulsion is then passed
ugh a centrifugal machine to remove the
from the water. The oil which passes
ugh the emulsion separators is substan-
ly free of water and emulsion and is
marketable condition. The oil leaving
separators contains a large quantity of
; so that it is passed through a heat in-
hanger to preheat incoming oil to be
ted. To avoid loss of low boiling point
stituents in the oil, the oil is held in
ed containers during the heating and
rating treatments and any vapors which
set free from the oil are collected, con-
sed and returned to the dehydrated oil.
igure 1 of the drawings illustrates dia-
nmatically an apparatus in which a
hod of dehydrating oil embodying the
erred form of the invention may be
ormed. The dehydration of petroleum
containing brine and emulsion in the
aratus shown in Fig. 1, may be carried
 as follows: Crude oil from a well is
ferably sent to a large storage tank where
 water is removed and the oil contain-
the water and emulsion is then allowed
low by gravity or pumped through a
 20, (Fig. 1) into a heat interchanger
The oil is heated in the interchanger 22
 temperature of approximately 100° F.
he dehydrated oil which has been treated
 is flowing back to storage. From the
rchanger 22, the heated oil passes
ugh a pipe 24 and is conducted by
ns of pipes 26 to heaters 28. The oil
eated in the heaters 28 by means of steam
ch is led in through a pipe 29 from steam
erators 30 and is raised to a temperature of approximately 140° F. or a tempera-
ture at which the water and emulsion will
tend to coagulate, and a temperature at
which the viscosity of the oil is sufficiently
low to permit the water and emulsion to
rapidly settle. The oil leaving the heaters
28 passes through pipes 30' into a water-
separating compartment of emulsion dehy-
drators 32 (see Figs. 2 to 5). Free water is
removed from the oil in compartments 34
and 36 and the partially dehydrated oil
is then slowly advanced in a moving stream
through a riffle separating compartment 38.
The velocity of flow of the oil in the sepa-
rating compartment is carefully regulated
so that the water and emulsion settling
through the oil body will not be agitated or
disturbed and the length of the separating
compartment is such that the lightest par-
ticles of water and emulsion will have suf-
ficient time to settle through the depth of
the oil stream while the stream is advancing
the length of the separating compartment.
The stream of oil advancing through the
separating compartment passes over a series
of pockets which collect the water and emul-
sion settling in the stream. The emulsion
and water, together with some oil, is con-
tinuously drawn off from the bottom of the
pockets to accelerate the velocity of set-
tling of the water and emulsion and to sepa-
rate the water and emulsion from the oil
stream. The liquid flowing out of the bot-
tom of the pockets has a direction which
constitutes a continuation of the general
direction of movement of the particles of
water and emulsion settling through the oil
body and the velocity of flow of the liquid
is regulated to avoid any disturbance of
the settling of water and emulsion in the
oil body. The dehydrated oil is removed
from the upper portion of the separating
compartment 38 so that there will be no
tendency for the water and emulsion to be
drawn out with the dehydrated oil.

The dehydrated oil leaving the separator
32 is substantially free of water and emul-
sion and is in marketable condition, but it
contains a large amount of heat which is
utilized in preheating the incoming oil to be
treated. To accomplish this, the oil leaving
the end of the separators 32 flows through
a conduit 40 and is carried by a pump 42
through a pipe 44 into the interchanger 22.
When the dehydrated oil has passed through
the interchanger 22, it emerges through a
pipe 46 at substantially the temperature of
the incoming oil in the pipe 20.

The water and emulsion drawn off from
the pockets in the floor of the emulsion
separator flows into conduits or gutters 48
positioned along the longitudinal sides of
the separators 32. The gutters 48 are con-
nected with a main gutter 50 which leads to
a water separator 52 (Figs. 11, 12 and 13).

The water, emulsion and oil entering the separator 52 is stratified, the water being continuously removed and the emulsion and oil being intermittently skimmed off from above the water. The emulsion and water separated in the separator 52 are drawn out into a pipe 54 by means of a pump 56 and forced through a pipe 58 into heaters 60. The oil is heated to substantially a temperature of 200° F. in the heaters 60 or to a temperature at which the emulsion will be broken down, and the heated oil is then passed into high temperature separators 62. The high temperature separators 62 shown in Figs. 6 and 7 have substantially the same construction as the separators 32 and the oil is passed therethrough in a slowly flowing stream to remove any water and emulsion which will settle in the oil. The dehydrated oil leaving the outlet ends of the separators 62 is drawn through pipes 64 and 66 by means of a pump 68 and conducted through a pipe 70 into the dehydrated oil pipe 44. This heated oil is there mixed with the dehydrated oil from the separators 32, passed through the heat interchanger 22 and then flows to storage. Water and emulsion separated from the oil in the separator 62 are collected in conduits or gutters 72 mounted along the longitudinal sides of the dehydrators 62 and pass through a main gutter 74 into a separating compartment 76 formed in the water separator 52. Free water is separated from the emulsion in the separating compartment 76 and the emulsion is drawn off of the top of the separating compartment 76 through a swing pipe 77 by means of a pump 78 and delivered to a centrifugal separator 80 where water of the emulsion is removed from the oil. The oil separated in the centrifugal machine 80 may be conducted to a storage tank 82 or forced by means of a pump 84 through a conduit 86 into the dehydrated oil pipe 44.

When the oil which has been heated in the interchanger 22 and heaters 28 and 60 is released in the water-separating compartments of the separators 32 and 62, some of the low boiling constituents of the oil are vaporized. These vapors will often continue to come off from the oil throughout its passage through the separators 32 and 62. To avoid a vaporization loss, the separators are constructed as gas-tight chambers and vapor-collecting pipes 88 are connected with the various compartments of the separators. The vapor pipes 88 connect with a conduit 90 which leads through a vacuum pump 92 to a condenser 94. The vapors are condensed in the condenser 94 and the condensate flows from the condenser through a pipe 95 and is introduced into the dehydrated oil pipe 44 through an expanding valve 96. The water separated from the oil in the centrifugal machine 80 and the water separators 52 and 76 is conducted through pipes 98 into a water reservoir 100. The various pumps used for handling the oil preferably are steam driven and the exhaust steam from the vapors is well adapted for use in the heaters 28. Where high temperatures, however, are required to preheat the oil flowing through the separators 62, it may be necessary to use superheated steam from the generators 30 in the heaters 60.

The emulsion separators 32 are shown more particularly in detail in Figs. 2, 3, 4 and 5. These separators all have the same construction and consist of closed gas-tight chambers of reinforced concrete construction. The oil enters the separating compartment 34 of the separator through the pipe 30 and it is allowed to quietly settle and stratify. The water settles to the bottom of the compartment 34 and may be withdrawn at opposite sides of the compartment through outlets 102 which empty into the emulsion gutters 48. The emulsion stands above the water and is permitted to pass through openings 104 in a partition wall 106, between the compartments 34, and 36, to prevent disturbance of the emulsion in the oil. The oil containing a comparatively small amount of emulsion flows over the top of the partition wall 106 into the water-separating compartment 36. When the heated oil is released from the pipe 30 in the entrance compartment 34, a large percentage of the low boiling point constituents are volatilized. To prevent the distribution of these gases through the separating chamber, a wall 108 projects from the bottom of the chamber cover 110 downwardly below the upper edge of the partition wall 106 to form a gas seal between the compartments 34 and 36. The vapors released from the oil create a vapor pressure in the compartment 34 which tends to retard the vaporization of the low boiling point constituents and the vapors are continuously removed through an outlet 112 which connects with a vapor-collecting pipe 88. The oil reaching the second water-removing compartment 36 is allowed to stratify further and water is removed from opposite sides of the compartment through outlets 114 and the floor in the forward part of the compartment is sloped in opposition to the flow of oil to drain the water to the outlets 114. The emulsion stratified in the compartment 36 passes through openings 116 in a partition wall 118 and the partially purified oil flows through openings 120 in the upper part of the partition wall 118. Any vapors which are collected in the compartment 36 are removed through an outlet pipe 122 which is connected with a vapor-removing pipe 88. The oil and emulsion entering the separating compartment 38 from the compartment 36 is comparatively free from water so that the separation in the compartment 38 consists principally in a separation of emulsion from the oil. A series of collecting pockets 124 for collecting the emulsion settling from the oil are formed in the floor of compartment 38 by a series of large sawteeth 126 which are arranged with the teeth opposing the direction of flow of oil through the compartment. The teeth 126 are preferably made of concrete construction and constitute the floor of the separating compartment. At the base of each of the teeth 126 are mounted a series of outlet pipes 128 (Fig. 5), which open into a drain 130 mounted in the floor and sloping from the center of the compartment to the opposite sides of the separator. Valves 132 are mounted in the drains 130 at opposite sides of the separator by which the rate of flow of water, emulsion and oil outwardly into the gutters 48 may be accurately controlled. A series of plugs 134 are mounted in the cover of the separating chamber immediately above the outlets 128 of each pocket 124 to permit access to the chamber for cleaning the outlets. The flow of liquid downwardly through the outlets 128 and drain 130 is a continuation of the general direction of settling of the emulsion and water through the stream of oil in the separating compartment 38 so that this flow does not create an agitation or disturbance of the emulsion in the oil body. The rate of flow can be accurately controlled by means of the valves 132 so that the material entering the gutters 48 through the drains 130 will contain a very small percentage of free oil. The separating compartment 38 is so designed that the lightest particles of emulsion will have had time to settle to the bottom of the stream of oil by the time the oil has advanced the length of the compartment. The dehydrated oil leaving the compartment 38 flows over a weir 136 (Fig. 4) formed in the upper portion of the end wall 138 of the separating compartment and passes through an outlet pipe 140 connected with the pipe 40 (Fig. 1). Any vapors which are separated from the oil in the compartment 38 are removed through outlet pipes 139 (Figs. 2 and 4) which are connected with a vapor-collecting pipe 88.

It is quite essential that the emulsion separator should be a gas-tight chamber in order to prevent loss of volatile vapors of the oil. The concrete construction of the separating chamber will necessarily be subjected to considerable variations in temperatures of the heated oils, and to provide for expansion and contraction of the concrete construction, the separator 32 is made in four sections. These sections are independently movable and are connected by means of vapor-tight expansion joints. The form of expansion joint used in the construction of the cover 110 is shown at 142 in Fig. 8. The joint 142 is filled with a high temperature asphalt which will insure a tight joint with the expansion and contraction of the cover. The joint for the side walls of the separator is shown at 144 in Fig. 9. A high temperature asphalt filling block 146 is placed in the joint 144 to make the chamber gas-tight. The expansion joint for the floor of the separating compartment is shown at 148 in Fig. 10, this joint 146 being filled with a high temperature asphalt to make the joint gas-tight. Throughout the length of the separator, a series of reinforcing ribs 150 are formed in the cover 110 to form a rigid structure which may be covered with heat-insulating materials to prevent the oil from being materially cooled in passing through the separating chamber.

The construction of the high temperature emulsion separators 62 is shown in detail in Figs. 6 and 7. The separators 62 have substantially the same construction as the separators 32 except that they are shorter and thus have a fewer number of emulsion separating pockets and the side and end walls are provided with a heat-insulating wall to prevent the oil from being cooled while it is passing through the separators. The oil and emulsion from the heater 60 is introduced into a water-removing compartment 152 of the separator through an inlet pipe 154. The water settling in the compartment 152 is removed through outlets 156 at opposite sides of the separator, the emulsion passes through outlets 158 in a division wall 160 and the partially purified oil flows over the division wall 160. A sealing wall 162 projects from a cover 164 for the separator, to trap gas in the compartment 154 and the gas collected in the compartment passes out through a pipe 166 which is connected with a vapor-collecting pipe 88 (Fig. 1). Oil and emulsion from the compartment 152 flow into a second water-separating compartment 168 where the oil is permitted to stratify, the water leaving through outlets 170 at opposite sides of the separator, the emulsion passing through openings 172 in a partition 174, and the partially separated oil passing through openings 176 in the upper portion of the partition 174. Vapors accumulated in the compartment 168 pass out through a pipe 178 which is connected with a vapor-collecting pipe 88. The oil flowing from the water-separating compartment 168 enters the emulsion-separating compartment 180 where the oil flows over a series of pockets 182 formed in the floor of the compartment by means of a series of saw-teeth 184. Vapors collected in the compartment 180 are removed through pipes 186 which connect with a vapor-collecting pipe 88. The dehydrated oil leaves the compartment 180 over a weir 188 formed in the end wall of the compartment and passes through an outlet pipe 190 which is connected with the pipe 66 (Fig. 1). The front end wall and the side walls of the separators 62 are composed of an outside wall 192 and an inside wall 194 which are spaced apart to provide a dead air space 196. The space 196 acts as a heat insulator to prevent the temperature of the oil flowing through the chamber from becoming materially lowered. The separators 62 are formed in two sections which are connected by means of expansion joints shown in Figs. 8, 9 and 10. The expansion joints in the side walls of the separator 62 differ from the expansion joints in the side walls of the separator 32 in that they have the inner walls 194 which are connected by corrugated plates 198 to provide for expansion and contraction.

The water separator for separating water from emulsion collected in the separators 32 and 62 is shown in detail in Figs. 11, 12 and 13. The emulsion collected in the gutter 50 from the separators 32 enters the water-separator 52 through an inlet pipe 200 and passes into a separating compartment 202 through openings 204 formed in the lower portion of a baffle wall 206. The emulsion stratifies in the compartment 202 with dehydrated oil on top, emulsion below the dehydrated oil, and water in the bottom. The water with some emulsion is forced out of the compartment 202 by hydrostatic pressure and passes through openings 208 formed in the bottom of a partition wall 210. The water flowing through the openings 208 passes into a space 212 formed between the partition 210 and a weir wall 214 which projects from the floor of the separator upwardly only a portion of the height of a second separating compartment 216. Boxes 218 containing chat or gravel are placed in the space 212 so that the water and emulsion passing upwardly through the space will be forced to pass through the chat. In passing through the chat, the emulsion will be partially broken up to permit the oil and water to coagulate. The emulsion, oil and water reaching the compartment 216 stratify with oil on top, emulsion in the middle, and water at the bottom.

The water is forced out of the compartment 216, by hydrostatic pressure, through openings 220 formed in the lower portion of a partition wall 222 and enters a space 224 formed between the partition 222 and a weir wall 226. The weir wall 226 projects from the floor of the separator upwardly only a portion of the height of a third separating compartment 228. Chat boxes 230 similar to the chat boxes 218 are placed in the space 224 to assist in breaking up any emulsion passing upwardly over the weir wall 226.

The emulsion, oil and water stratify in the compartment 228 and the water is forced by hydrostatic pressure through openings 232 formed in the lower portion of a partition 234. The water flowing out through the openings 232 enters a space 236 formed between the partition 234 and an end wall 238 of the separator 52. By the time the emulsion has reached the compartment 228, practically all of the free water has been removed from the emulsion and the water entering the space 236 flows out through an opening 240 into the pipe 98 (Fig. 1) to go to a water reservoir 100. The compartments 202, 216 and 228 are inter-connected by means of openings 242 in the partitions 210 and 222 to equalize the pressure in the compartments so that the oil, water and emulsion will flow by gravity from the entrance pipe 200 toward the water outlet 240. It will be noted that the upper edge of the weir wall 214 is higher than the upper edge of the weir wall 226, and the water outlet opening 240 is lower than the upper edge of the weir wall 226. This construction permits the continuous flow of water from the entrance 200 toward the outlet 240. The oil and emulsion collecting in the upper portions of the compartments 202, 216 and 228 may be intermittently skimmed off by means of swing pipes 244 which are pivotally connected to outlet pipes 246 mounted in the side wall of the separator 52. The emulsion is drawn off of the top of the compartments by means of the pump 56 which is connected with the pipes 246 by the pipe 54 (Fig. 1). The gutters 48 and 72 at the sides of the separators 32 and 62 respectively and the gutters 50 and 74 are covered to prevent the escape of vapors and to retain the heat in the emulsion leaving the separators. The separator 52 is a covered gas-tight chamber to prevent loss of vapor and to conserve heat in the oil. Gas accumulating in the compartments 202, 216 and 228 will be removed through the swing pipes 244. Preferably, the separator 52 is made of concrete construction and is positioned below the surface of the ground to assist in conserving the heat of the oil.

The emulsion separated in the separators 62 is treated in a water-separator 76 shown more particularly in Figs. 11 and 12. The separator 76 is made of concrete construction and forms a part of the water-separator 52. The emulsion flows from the separators 62 through the gutter 74 and enters an open separating compartment 248 through an inlet pipe 250. The emulsion stratifies in the compartment 248 with the water at the bottom and the oil and emulsion in the upper portion. The water is forced out of the compartment 248 by hydrostatic pressure and passes through an opening 252 formed in a partition wall 254. The water flowing through the opening 252 enters a space 256 formed between the partition 254 and the end wall 258 of the separator 76 and overflows through an outlet pipe 260 connected with the water-outlet pipe 98 (Fig 1). The emulsion collected in the compartment 248 is intermittently drawn off by means of the pump 78 (Fig. 1), through the swing pipe 77. The swing pipe 77 is pivotally connected with the outlet pipe 262 mounted in the side wall of the separator 76 and the outlet pipe 262 is connected in turn with a pipe 264 leading to the pump 78.

The heat interchanger 22 and the heaters 28 and 60 may be any of the approved forms of apparatus which are used for these purposes.

It will be noted that with the process and apparatus outlined above, oil may be dehydrated while moving in a continuous stream through the apparatus. It is not necessary with the above process and apparatus to have large storage tanks for holding the oil while settling, but the oil is in marketable condition when it leaves the apparatus. Although the oil is heated while being dehydrated, the heat put into the oil is interchanged to preheat incoming oil to be treated, so that the heating of the oil can be accomplished with a comparatively small amount of heat. Also, the oil is heated while it is continuously advancing and is heated in stages so that there is comparatively little danger of the oil being burned or injured by heat. Further, the improved process and apparatus permits the emulsion to be separated and practically all broken down into water and oil without the use of such high temperatures as would be liable to injure the oil.

In the specification and claims, the term "emulsion" is used which is intended to cover any water containing material such as an oil-water colloid or semi-colloid or water suspended in oil.

The preferred form of the invention having been thus described, what is claimed as new is:

1. A method of dehydrating petroleum oil, comprising slowly advancing the oil in a continuous stream across a series of pockets, settling emulsion into said pockets, and withdrawing said emulsion from said pockets while said stream is advancing.

2. A method of dehydrating petroleum oil, comprising heating the oil, passing the heated oil in a continuous stream through a closed chamber, and removing emulsion from the bottom of said stream as it settles by gravity.

3. A method of dehydrating petroleum oil, comprising heating the oil, passing the heated oil in a continuous stream through a closed chamber, removing emulsion from the bottom of said stream as it settles by gravity, withdrawing oil vapors from said chamber, condensing said vapors, and mixing the condensate with the dehydrated oil.

4. A method of dehydrating petroleum oil, comprising heating the oil, passing the heated oil in a continuous stream through a closed chamber, removing emulsion from the bottom of said stream as it settles by gravity, and interchanging the heat in the dehydrated oil to untreated oil entering said chamber.

5. A method of dehydrating petroleum oil, comprising slowly advancing oil in a continuous stream and causing a continuous current of water containing liquid to flow from the bottom of the stream throughout the length thereof at a rate such as to cause a lowering of the level and withdrawal of the said water containing liquid without causing a disturbance in the overlying liquid layer.

6. A method of dehydrating petroleum oil, comprising slowly advancing oil in a continuous stream across a series of pockets, and causing a continuous current of water containing liquid to flow from said pockets at such a rate as to cause no disturbance of liquid in said stream, using the current to assist gravity in withdrawing emulsion settling through the stream.

7. A method of dehydrating petroleum oil, comprising slowly advancing oil in a continuous stream across a series of pockets having the width of the stream, causing a continuous current of liquid to flow from the bottom of said pockets across approximately the entire width of said stream, and proportioning the rate of flow of said current to draw emulsion out of the stream therewith.

8. A method of dehydrating petroleum oil, comprising heating the oil, passing the heated oil in a continuous stream through a closed chamber, removing emulsion from the bottom of said stream as it settles by gravity, reheating said emulsion and advancing it in a stream across a series of pockets, and withdrawing emulsion from the bottom of said second stream while recovering dehydrated oil from the uper part of said second stream.

9. A method of dehydrating petroleum oil, comprising heating the oil, passing the heated oil in a continuous stream through a closed chamber, removing emulsion from the bottom of said stream, reheating the emulsion and passing the heated emulsion in a stream through a closed chamber, withdrawing emulsion from the bottom of said emulsion stream while recovering dehydrated oil from the upper portion of said emulsion stream, removing oil vapors from said chambers, condensing said vapors, and mixing the condensate with the dehydrated oil.

10. A method of dehydrating petroleum oil, comprising heating oil in a series of stages, the oil being heated in a succeeding stage comprising the residuum of oil heated and dehydrated in a preceding stage and the temperature of the oil being progressively increased in the succeeding stages, advancing the heated oil of each stage in a continuous stream through a chamber, and separating from the lower portion of each of said streams the residuum to be treated in the succeeding stage.

11. An oil dehydrating apparatus having, in combination, a heat interchanger, an emulsion separator, a water separator, means for conducting emulsion from the emulsion separator to the water separator, means for conducting oil through the heat interchanger to the emulsion separator and means for conducting dehydrated oil from the emulsion separator through the heat interchanger.

12. An oil dehydrating apparatus having, in combination, an emulsion separator having a vapor collecting space, a water separator, means for conducting emulsion from the emulsion separator to the water separator, means for conducting oil to the emulsion separator, means for conducting dehydrated oil away from said emulsion separator, and means for collecting and condensing vapors from said emulsion separator.

13. An oil dehydrating apparatus having, in combination, a heat interchanger, an oil heater, an emulsion separator, a water separator, a second emulsion separator, means to conduct emulsion from the first emulsion separator to said water separator, means to conduct oil through said interchanger and heater to said first emulsion separator, means to conduct treated oil from said emulsion separator through said interchanger, and means to conduct oil from said water separator to the said second emulsion separator.

14. An oil dehydrating apparatus having in combination an emulsion separator, a heater connected therewith, means to conduct oil through the said heater to the said separator, a second emulsion separator adapted to treat oil at a higher temperature than the first separator, a heater connected therewith, a water separator, means to conduct emulsion from the first mentioned emulsion separator to the said water separator, means to conduct oil and emulsion from the said water separator through the second mentioned heater to the second emulsion separator, and means to conduct dehydrated oil away from the said emulsion separators.

15. An oil dehydrating apparatus having in combination an emulsion separator, a heater connected therewith, means to conduct oil through the said heater to the said separator, a second emulsion separator adapted to treat oil at a higher temperature than the first separator, a heater connected therewith, a water separator, means to conduct emulsion from the first mentioned emulsion separator to the said water separator, means to conduct oil and emulsion from the said water separator through the second mentioned heater to the second emulsion separator, a centrifugal separator, and means to conduct emulsion from the second emulsion separator to the said centrifugal separator.

16. In an oil dehydrating apparatus, a separator comprising a gas-tight chamber, a gas-sealed oil entrance compartment in said chamber, and a separating compartment in said chamber having a floor provided with a series of pockets, and means for withdrawing liquid material from the base of said pockets.

17. In an oil dehydrating apparatus, a separator comprising a gas-tight chamber, a water separating compartment in said chamber, an emulsion separating compartment in said chamber having a floor provided with a series of pockets, means for withdrawing liquid material from the base of said pockets and means therein for regulating the flow of said liquid material.

18. In an oil dehydrating apparatus, a separator comprising a gas-tight chamber having a series of pockets in its floor arranged transversely of the chamber, means for withdrawing liquid material from said pockets, and a dehydrated oil outlet mounted near the upper portion of said chamber.

19. In an oil dehydrating apparatus, a separator comprising a gas-tight chamber, a series of teeth formed in the floor of said chamber, said teeth being opposed to the direction of flow of liquid through the chamber, outlet drains positioned at the bottom of the teeth to withdraw emulsion from said chamber, and means for withdrawing dehydrated oil from said chamber.

20. In an oil dehydrating apparatus, a separator comprising a closed chamber having double side walls spaced apart to leave a dead air space between them, a water removing compartment at the entrance end of said chamber, a separating compartment communicating with said water removing compartment and having a plurality of transverse pockets formed in the floor thereof, drains mounted in said floor at the bottom of said pockets, and means to withdraw dehydrated oil from said separating compartment.

21. In an oil dehydrating apparatus, an emulsion separator comprising a water removing compartment arranged to stratify hydrated oil and having separate outlets for water, emulsion and oil, a separating compartment provided with a series of pockets in its floor, means to withdraw liquid from the base of said pockets, and means to withdraw dehydrated oil from the upper portion of said separating compartment.

22. In an oil dehydrating apparatus, an emulsion separator comprising a water removing compartment formed in two sections, each section having water, emulsion and oil outlets, a separating compartment provided with a series of pockets in its floor, means to withdraw liquid from the base of said pockets, and means to withdraw dehydrated oil from said separating compartment.

23. In an oil dehydrating apparatus, a water separator comprising a closed chamber having a series of compartments, partition walls separating said compartments having openings in their lower portions, weir walls spaced from said partitions to provide a liquid space between them, said weir walls extending from the floor of the separator through only a portion of the height of said chamber, a filtering medium positioned between said partitions and weir walls, means to withdraw water from said separator, and means to withdraw oil and emulsion from the upper portion of said compartments.

24. In an oil dehydrating apparatus, an emulsion separator comprising a gas-tight chamber built up of a series of longitudinal sections, expansion joints between said sections, a series of separating pockets formed in the floor of said chamber, means for withdrawing liquid from the bottom of said pockets, and means to withdraw dehydrated oil from said chamber.

In testimony whereof I affix my signature.

HAROLD ORIN BALLARD.